United States Patent [19]

Vinegar et al.

[11] 4,398,151

[45] Aug. 9, 1983

[54] METHOD FOR CORRECTING AN ELECTRICAL LOG FOR THE PRESENCE OF SHALE IN A FORMATION

[75] Inventors: Harold J. Vinegar; Monroe H. Waxman, both of Houston, Tex.

[73] Assignee: Shell Oil Company, Houston, Tex.

[21] Appl. No.: 370,712

[22] Filed: Apr. 22, 1982

Related U.S. Application Data

[62] Division of Ser. No. 115,472, Jan. 25, 1980, Pat. No. 4,359,687.

[51] Int. Cl.³ .............................................. G01V 3/24
[52] U.S. Cl. ..................................... 324/323; 324/366
[58] Field of Search ............... 324/323, 347, 351, 357, 324/360–364, 366

[56] References Cited

U.S. PATENT DOCUMENTS

| | | | |
|---|---|---|---|
| 2,766,421 | 10/1956 | Wait et al. | 324/357 |
| 2,988,690 | 6/1961 | Love et al. | 324/362 X |
| 3,113,265 | 12/1963 | Woods et al. | 324/357 |
| 3,701,940 | 10/1972 | Nilsson | 324/357 |
| 3,895,289 | 7/1975 | Rickey et al. | 324/323 |
| 3,902,113 | 8/1975 | Bridges et al. | 324/366 X |
| 4,015,195 | 3/1977 | Hoyer et al. | 324/323 |
| 4,236,113 | 11/1980 | Wiley | 324/366 |

OTHER PUBLICATIONS

Waxman et al.; Electrical Conductivities in Oil–Bearing Shaly Sands, *SPE Journal*, Jun. 1968, pp. 107–122.
Waxman et al.; "Electrical Conductivities in Shaly Sands–I The Relation Between, . . . II, The Temperature . . . ", *Journal of Petroleum Tech.* 1974, pp. 213–225.

*Primary Examiner*—Gerard R. Strecker

[57] ABSTRACT

An apparatus is disclosed for borehole measurements of the induced polarization of earth formations. The apparatus consists of an induced polarization logger capable of measuring both in-phase and quadrature conductivities in the frequency domain. A method is described which uses these measurements to determine cation exchange capacity per unit pore volume, $Q_v$, brine conductivity, $C_w$, and oil and water saturations, $S_o$ and $S_w$, in shaly sands.

7 Claims, 6 Drawing Figures

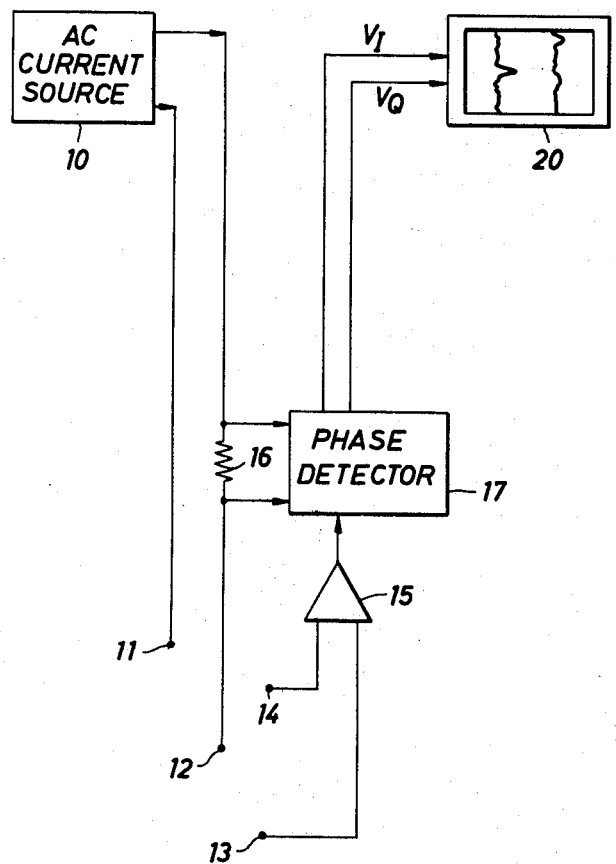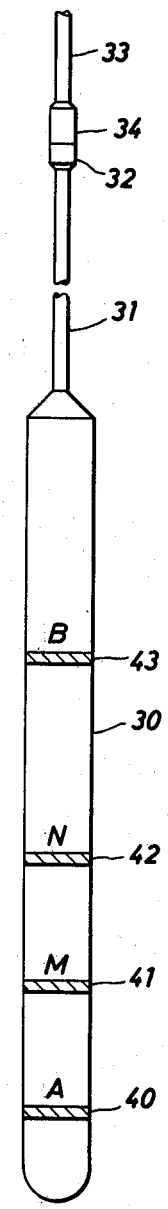
FIG.1
FIG.2

METHOD FOR CORRECTING AN ELECTRICAL LOG FOR THE PRESENCE OF SHALE IN A FORMATION

This is a division of application Ser. No. 115,472, filed Jan. 25, 1980 now U.S. Pat. No. 4,359,687.

BACKGROUND OF THE INVENTION

One of the oil industry's basic tools for in-situ determination of hydrocarbon saturation is electrical resistivity logging. Since 1942, Archie's empirical relations have been used to calculate oil (and water) saturations in clean sands. In shaly sands the exchange counterions associated with the clay minerals increase the rock conductivity compared to that of a clean or clay-free sand and the simple Archie relations are no longer valid. In the case of shaly sands, the Waxman-Smits equation has been successful in accounting for the additional clay conductance and thereby permitting the quantitative evaluation of oil (and water) saturations in these formations.

The Waxman-Smits equation for 100 percent water-saturated sands refers to the following equation:

$$C_I = (1/F^*)(C_w + BQ_v) \qquad (1)$$

where $C_I$ = in-phase conductivity (mho-cm$^{-1}$) of the completely water-saturated formation $F^*$ = formation resistivity factor as defined by Waxman-Smits $C_w$ = conductivity of saline solution (mho-cm$^{-1}$) contained in the formation rock $Q_v$ = Waxman-Smits shaliness factor, defined as the cation exchange capacity of the shaly sand per unit pore volume of the sand (meq-ml$^{-1}$ or equivalent-liter$^{-1}$).

$B$ = equivalent conductance of the exchange cations associated with the clay minerals in the sand formation (mho-cm$^2$-meq$^{-1}$). B is expressed by Waxman-Smits as a function of $C_w$.

$F^*$ according to Waxman-Smits is described by the relation:

$$F^* = \phi^{-m^*} \qquad (2)$$

where $\phi$ is the porosity of the rock and $m^*$ is the cementation factor, usually varying from about 1.5 to 2.2. This equation and a description of its use was published by the authors Waxman-Smits in the 1968 Society of Petroleum Engineering Journal, pages 107–122, June issue, in an article entitled "Electrical Conductivity in Oil-Bearing Shaly Sands."

The Waxman-Smits equation for the in-phase conductivity of a partially brine-saturated shaly sand is:

$$C_I' = \frac{S_w^{n^*}}{F^*}\left(C_w + \frac{BQ_v}{S_w}\right) \qquad (3)$$

where $C_I'$ = in-phase conductivity (mho-cm$^{-1}$) of the partially oil-saturated shaly sand $n^*$ = saturation exponent defined by Waxman-Smits $S_w$ = fraction of sand pore volume filled with water or the water saturation. Note that $S_w = (1 - S_o)$ where $S_o$ is the fraction of sand pore volume filled with oil or the oil saturation.

From the equations describing $C_I$ and $C_I'$, the expression for the Resistivity Index I as given by Waxman-Smits is:

$$I = \frac{C_I}{C_I'} = S_w^{-n^*}\left(\frac{C_w + BQ_v}{C_w + \frac{BQ_v}{S_w}}\right) \qquad (4)$$

Laboratory measurements by Waxman-Thomas as well as current industry usage have confirmed the Waxman-Smits equations for $C_I$, $C_I'$ and I as given above. Waxman and Thomas also give the temperature dependence of B. The Waxman-Thomas work was published in the 1974 Journal of Petroleum Technology, pages 213–225, and entitled "Electrical Conductivities in Shaly Sands.I. Relationship between Hydrocarbon Saturation and Resistivity Index.II.The Temperature Coefficient of Electrical Conductivity."

As currently used by the industry, the Waxman-Smits equation requires independent measurement of petrophysical parameters including the cation exchange capacity of the rock per unit pore volume ($Q_v$). With known techniques it has not been possible to measure this quantity in situ.

Determination of $Q_v$ values generally requires the use of expensive rock samples from the earth formations of interest, either obtained from cores or side-wall samples. Such rock samples are not usually available. Another disadvantage of obtaining $Q_v$ from core samples is that the sample may not be representative of the formation as a whole. Furthermore, even if $Q_v$ values are known at the specific depths where samples were taken, calculation of oil saturations are subject to large errors if the in-situ waters are fresh, i.e., contain only low concentrations of soluble electrolytes.

The present invention provides an apparatus and a method using electrical resistivity logging and particularly induced polarization logging to determine the value of $Q_v$ in-situ and the oil/water saturations, $S_o$ and $S_w$, in clay-bearing sands. The term "induced polarization logging" is used to describe a logging method wherein an electrical current is induced in the formation and then the resulting out-of-phase voltage is measured. In particular, induced polarization logging relates to measurements of the quadrature or reactive component of the electrical impedance of the formation. The history of induced polarization logging is summarized in papers entitled "Complex Formation Resistivity-The Forgotten Half of the Resistivity Log" by Snyder et al. presented at the 18th Annual Logging Symposium, June 5–8, 1977 of the SPWLA and "Investigation of Wells by the Induced Polarization Method (Electrolytic Well Logging)", by Dakhnov et al. in Sb. Promislovaya Geofizika, Vnetoneft; translated by G. V. Keller: The Log Analyst, Nov.–Dec. 1967, pp. 46–82.

In addition to the above papers, U.S. Pat. No. 3,902,113 describes an apparatus for obtaining an induced electrical polarization log of an earth formation. In particular, the patent describes an apparatus which includes means for inducing electrical polarization of an earth formation in a manner such that each succeeding polarization is in an opposite direction to the preceding one. A measuring circuit controlled by timing logic measures the induced electrical potential difference between two locations during two other time intervals in each cycle of operation. The measured signals are applied to a differential amplifier which produces a difference signal and during one of the two measuring time intervals of each cycle the difference signal is inverted. The signal which is not inverted and the inverted signal are integrated to provide an output which is a measure of the decay of the potential difference. From the above brief description it is seen that the patent applies a DC pulse to the formation, then measures the decay signal to determine the induced polarization of the formation. The decay signal is, of course, the result of the reactive component of the induced polarization and is related thereto.

U.S. Pat. No. 3,895,289 describes another method for determining the electrical resistivity of a shaly formation wherein one measures the dielectric constant of the formation from the voltage decay. Previously determined correlations between dielectric constants and conductivity parameters from earth samples are used to determine the effect of shaliness on resistivity.

As seen from the above brief description of the prior art, none of the prior art measures the quadrature conductivity of the formation at discrete frequencies nor do they provide means for obtaining the shaliness factor $Q_v$ downhole without earth samples. The advantages of measuring the quadrature conductivity at discrete frequencies, rather than from the voltage decay following a pulse, will appear hereafter in the detailed description which follows. In addition, none of the references attempt to define the oil saturation of the formation which is, of course, the most important information that is obtained from logging measurements.

SUMMARY OF THE INVENTION

In accordance with the teachings of this invention, a sinusoidal electric current is generated in the formation at a discrete frequency and the in-phase and quadrature voltage induced in the formation at that frequency in response to said current are measured. The apparatus of this invention consists of a non-metallic sonde containing a pair of current electrodes and a pair of voltage electrodes of the non-polarizable type. The sonde contains a high input impedance differential amplifier, a reference resistor, and a phase detector. These elements are configured so as to avoid spurious phase shifts due to electrode polarization and interwire capacitance in the logging cable.

Voltage measurements are made in the frequency domain. Either in-phase and quadrature conductivities, $C_I$ and $C_Q$, or $C_I$ and phase angle $\theta = C_Q/C_I$ are obtained from the voltage measurements and are corrected for the effects of finite borehole diameter, mud invasion and finite bed thickness. Corrected values for $C_I$ and $C_Q$, together with a downhole measurement of porosity, are used in the equations:

$$C_I = \frac{1}{F^*}(C_w + BQ_v)$$

$$C_Q = \frac{1}{F^*}\lambda_{eff}Q_v$$

to determine cation exchange capacity per unit pore volume, $Q_v$, and brine conductivity, $C_w$, in a 100 percent brine-saturated shaly sand. The parameter $\lambda_{eff}$ is the quadrature equivalent conductivity (mho-cm$^2$-meq$^{-1}$) for shaly sands. In an oil-containing shaly sand, the oil saturation $S_o$ can be determined in addition from the equations:

$$C_I = \frac{S_w^{n*}}{F^*}\left(C_w + \frac{BQ_v}{S_w}\right)$$

$$C_Q = \frac{S_w^{n*-1}}{F^*}\lambda_{eff}Q_v$$

where $S_o = 1 - S_w$.

BRIEF DESCRIPTION OF THE DRAWINGS

The present invention will be more easily understood from the following detailed description when taken in conjunction with the attached drawings in which:

FIG. 1 is a block diagram of the logging tool of this invention.

FIG. 2 is an elevation view of the logging tool constructed according to this invention.

DESCRIPTION OF A PREFERRED EMBODIMENT

Figure 3:
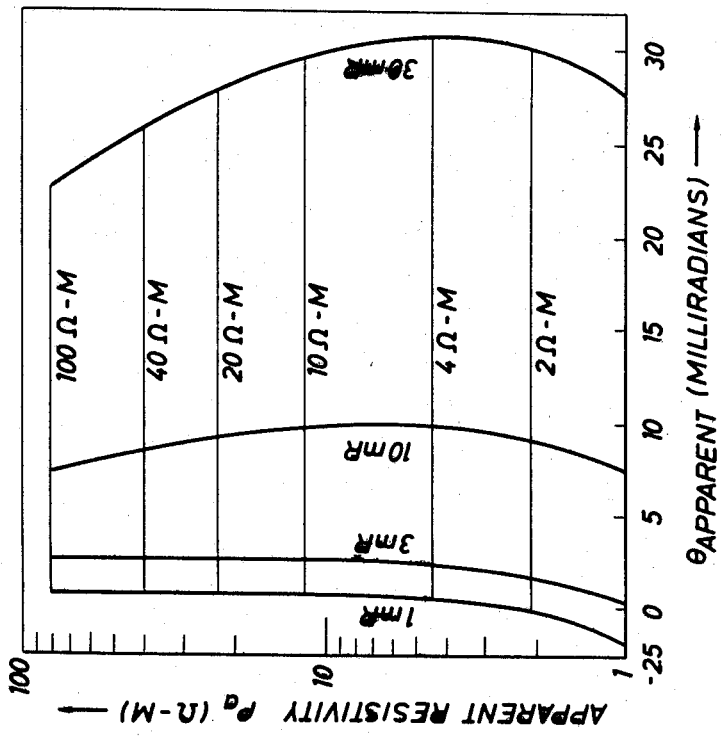
FIG. 3 is an example of a borehole departure curve for a 16" Normal array in an 8" borehole at a frequency of 1 Hz.

Referring now to FIG. 1 there is shown in block diagram form a logging instrument which is capable of making accurate measurements of both the in-phase and the quadrature components of the induced polarization signal at a discrete frequency. In particular, there is shown an AC current source 10 which is coupled to two electrodes 11 and 12 disposed in a borehole. The current should have a frequency of between one and 100 kHz and preferably in the range of 0.1 to 10 Hz. The signal induced in the formation by the application of the current is measured at two electrodes 13 and 14 and amplified by the high input impedance differential amplifier 15. The signal from the differential amplifier is supplied to the phase detector 17 which also receives a reference voltage proportional to the AC current across series resistor 16. The phase detector measures the in-phase and quadrature components $V_I$ and $V_Q$, or equivalently, the modulus $V_R = \sqrt{V_I^2 + V_Q^2}$ and phase angle $\theta = V_Q/V_I$ of the signal from amplifier 15 by comparing it with the reference signal across resistor 16. The in-phase and quadrature outputs of the phase detector are then sent to the surface to be recorded on a chart recorder 20 or supplied to suitable computing means not shown. It is well within the skill of the art to take the signals and program a general purpose computer to provide numerical outputs if so desired.

Although the system of the present invention has shown the phase detector 17 and reference resistor 16 as being located in the logging tool, it would be obvious to one skilled in the art to locate aforesaid phase detector and reference resistor at the surface. Under such an arrangement the signal from amplifier 15 is transmitted uphole. However, this arrangement would only be satisfactory using short lengths of logging cable because capacitive coupling in the cable would cause phase shifts not due to the induced polarization of the formation. It is also obvious that the reference resistor 16 could still be located in the tool while the phase detector 17 is located at the surface. Under this arrangement both the signal from amplifier 15 and the reference signal from reference resistor 16 are transmitted uphole. This arrangement has the advantage that both reference signal and amplifier signal experience the same phase shift from cable capacitance, and therefore no relative phase shift. Since relative phase shift between current and voltage is the important quantity in induced polarization measurements, this arrangement would be satisfactory with long logging cables. Still another possible embodiment of this invention is to locate the phase detector 17 at the surface, digitize the signal from amplifier 15 within the logging tool, transmit the digitized signal to the surface, convert the signal back to analog form, and supply said signal to the phase detector 17. Under this arrangement there are no phase shifts due to cable capacitance because only digital signals are transmitted to the surface. This arrangement would be satisfactory with any cable length. It is expressly understood that these embodiments of the invention are not to be construed as defining the limits of the invention.

The apparatus described in FIG. 1 has several advantages compared with the existing art for induced polarization logging tools. Compared to the time-domain logging tools described in U.S. Pat. Nos. 3,902,113 and 3,895,289, the frequency-domain sinusoidal current source in this invention improves the signal-to-noise ratio because the phase detector excludes noise at all frequencies except a narrow band at the source frequency. In addition, there is no requirement for compensation of spontaneous potentials as described in U.S. Pat. No. 3,902,113, because these potentials will vary at frequencies different from the source frequency.

Still another advantage of this invention is that the high input impedance amplifier in the sonde prevents polarization of the voltage electrodes by currents coupled into the voltage leads from the alternating current source. Still another advantage is that capacitive coupling between leads in the cable does not introduce spurious phase shifts which would mask the true induced polarization of the formation.

The magnitude of the phase shift $\theta$ in sedimentary rocks is typically less than 30 milliradians. Therefore, small instrumental effects which are indistinguishable from true formation induced polarization must be eliminated in the logging tool. The additional conditions under which valid induced polarization results are obtained are further disclosed in the following.

Referring now to FIG. 2 there is shown an elevation view of a logging tool suitable for carrying out the measurements of the present invention. In particular, there is shown a sonde 30 which is formed of a non-conducting material, for example, fiberglass, rubber or plastic material. The exterior of the logging tool must be non-metallic to avoid electrical polarization of the housing by the current in the borehole.

The sonde is connected to a jumper cable 31 which has a length of at least 50 feet and preferably on the order of 100 feet or more. In addition, jumper cable 31 is electrically insulated on its outer surface to avoid electrical polarization by the current in the borehole. The upper end of the jumper cable is provided with a suitable cable head 32 which will mate with cable head 34 of a conventional well logging cable 33. The term "conventional well logging cable" is used to refer to a cable having a central electrical conductor surrounded by six additional electrical conductors which are maintained in a relative position by suitable flexible insulating material with conductors surrounded by steel armor which serves both as a stress member for raising and lowering logging instruments in a borehole and as a ground return for the cable. If an attempt was made to connect this type of logging cable directly to the sonde, the steel outer armor of the cable would distort any measurements being made.

The sonde is provided with a plurality of electrodes, four of which are shown, 40–43. In FIG. 2 the current electrodes are labeled A and B, and the voltage electrodes are labeled M and N. The electrode arrangement determines the depth of investigation in the formation and the response of the device opposite thin beds. While four electrodes are shown, any additional number can be used and spaced at any desired location. However, the electrodes must consist of at least one pair of current electrodes and a separate pair of voltage electrodes to avoid polarization of the voltage electrodes which would occur if current were to be conducted through them. This is an essential feature of this invention. A two-electrode logging tool, such as that described in U.S. Pat. No. 3,895,289, cannot make valid measurements of induced polarization because of electrode polarization effects.

In addition, further precautions should be taken to prevent or minimize electrode polarization phenomena. This may be accomplished through the use of a porous platinum-black coating on lead electrodes, or the use of non-polarizable voltage electrodes such as silver/silver chloride or copper/copper sulfate electrodes.

Referring now to a method for interpreting the measurements of the aforementioned logging tool, apparent values of $C_I$ and $C_Q$ are first calculated from the measured in-phase and quadrature voltages:

$$(C_I)_{Apparent} = KI_o/V_I \tag{5}$$

$$(C_Q)_{Apparent} = KI_o/V_Q \tag{6}$$

where $I_o$ is the peak amplitude of the sinusoidal current $I = I_o \sin \omega t$, and K is a geometry factor that depends on the arrangement of electrodes on the logging tool:

$$K = \frac{1}{4\pi}\left(\frac{1}{\overline{AM}} + \frac{1}{\overline{BN}} - \frac{1}{\overline{AN}} - \frac{1}{\overline{BM}}\right) \tag{7}$$

Here $\overline{AM}$ refers to the distance between current electrode A and voltage electrode M, $\overline{BN}$ refers to the distance between current electrode B and voltage electrode N, etc. The apparent phase angle is computed from $$(\theta)_{Apparent} \simeq \tan\theta = V_Q/V_I = \frac{(C_Q)_{Apparent}}{(C_I)_{Apparent}} \tag{8}$$

where the approximation is valid for small values of phase angle such as are found in sedimentary rocks.

Values of $(C_I)_{Apparent}$, $(C_Q)_{Apparent}$, and $(\theta)_{Apparent}$ are now corrected for the effects of the borehole on the measurement by using borehole departure curves for the particular electrode electrode configuration and frequency of the logging tool. The method of preparation of departure curves to determine true values of $C_I$, $C_Q$, and $\theta$ is well known to practitioners in the art, as evidenced, for example, by the references:

H. O. Seigel, "A Theory of Induced Polarization Effects" in *Overvoltage Research and Geophysical Applications*, ed. J. R. Wait, Pergamon Press, New York, 1959, pp. 4–21. also J. R. Wait, "The Variable-Frequency Method" in the aforementioned text, pp. 29–49. and A. A. Brant, "Examples of Induced-Polarization Field Results in the Time Domain" in *Mining Geophysics* Vol. 1, Society of Exploration Geophysicists, publishers, 1966, pp. 288–305.

Figure 4:
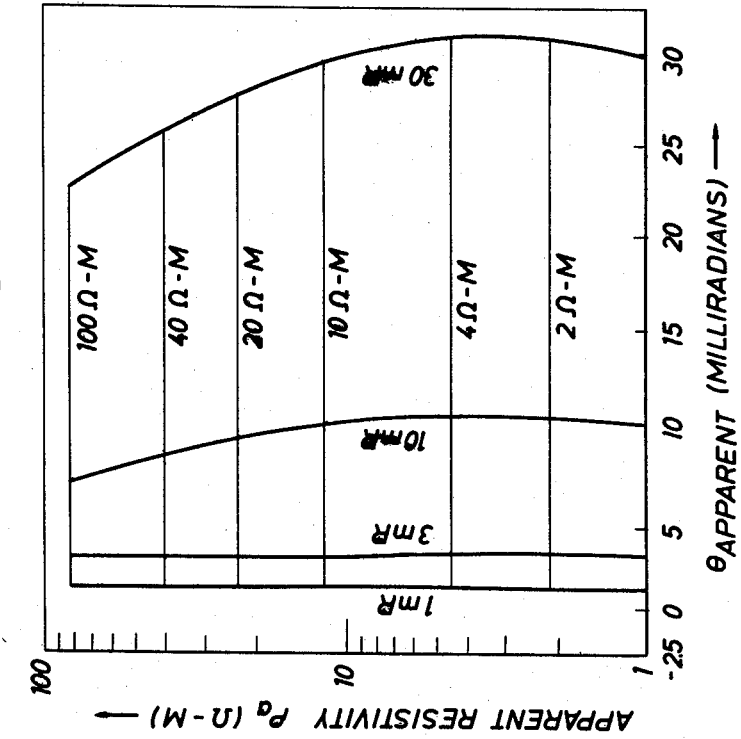
FIG. 4 is an example of a borehole departure curve for a 16" Normal array in an 8" borehole at a frequency of 10 Hz.

Referring now to FIG. 3 there is shown an example of a borehole departure curve at 1 Hz for an electrode array with $\overline{AM}=16''$, $\overline{AN}=20'$, $\overline{BN}=69'$, $\overline{BM}=88'$ computed for an 8" borehole containing drilling mud with a resistivity of 1 ohm-meter. The method used to generate FIG. 3 is described by H. O. Seigel in the aforementioned article. Referring now to FIG. 4 there is shown a departure curve for the same conditions as FIG. 3 except the source frequency is 10 Hz. FIG. 4 differs from FIG. 3 because the inductive coupling in the formation is larger at the higher frequency, as described by Wait in the aforementioned article.

After true values of $C_I$, $C_Q$ and $\theta$ are obtained, the petrophysical parameters $Q_v$, $C_w$ and $S_w$ are determined from the equations and method now described as part of this invention.

Figure 5:
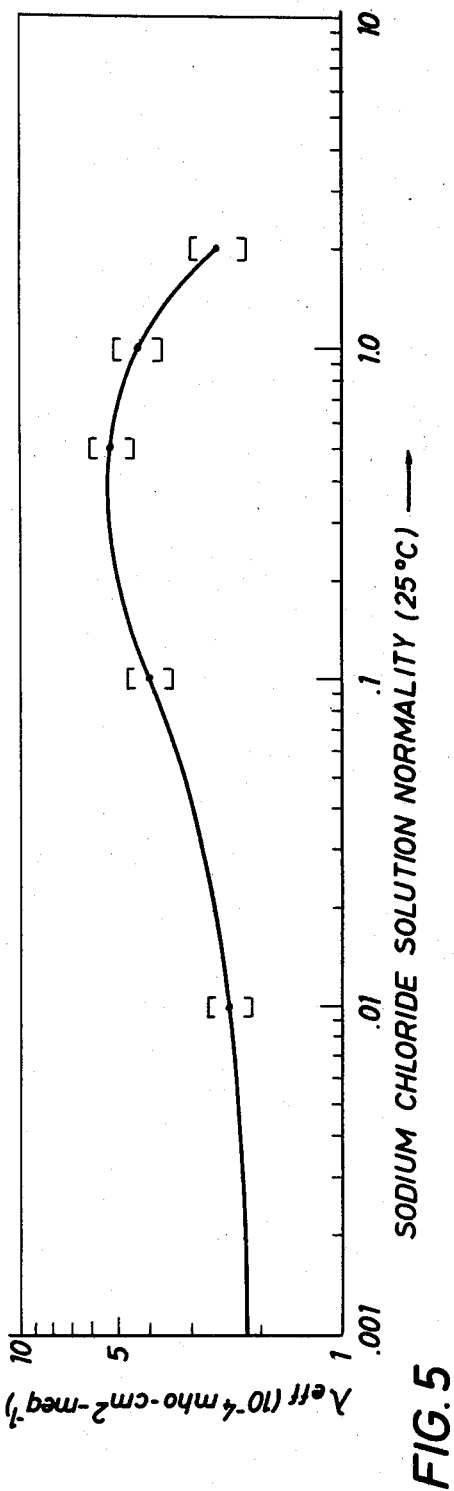
FIG. 5 shows the values of the $\lambda_{eff}$ parameter, required to relate the quadrature conductivities of shaly sands to their respective shaliness factors, $Q_v$, as a function of sodium chloride concentration present in the aqueous phase of the sedimentary formation at 25° C.

This invention teaches that the quadrature (or out-of-phase) conductivity in shaly sands is caused by gradients of ion concentration induced at clay sites in the sandstone resulting from the applied electric field. A physical model leads to a general equation for the quadrature conductivity in completely water-saturated sands:

$$C_Q = \frac{1}{F^*} \lambda_{\it eff} Q_v \quad (9)$$

where $C_Q$ is the quadrature conductivity (mho-cm$^{-1}$) of the water-bearing shaly sand, $\lambda_{\it eff}$ is the quadrature equivalent conductivity (mho-cm$^2$-meq$^{-1}$) and all other parameters (F*, $Q_v$) are as defined by Waxman-Smits. This invention demonstrates that for a particular water salinity, the value of $\lambda_{\it eff}$ is essentially constant and is uniquely valid for shaly sands in general, independent of the different earth formations in which the rocks are found. As part of this invention, FIG. 5 reveals the specific values of $\lambda_{\it eff}$ as a function of varying sodium chloride concentration at 25° C., the latter representing brines commonly encountered in earth formations. The error bars shown in FIG. 5 represent 95 percent confidence limits at each salinity value, and are derived from extensive measurements utilizing twenty sandstone samples taken from eleven different earth formations. These samples represent wide variations both in clay mineral types and clay distribution in the rocks; $Q_v$ values for these samples also cover a wide range, from 0.03 to 0.95 meq/ml. Values of $\lambda_{\it eff}$ are tabulated in Table 1 for NaCl electrolyte for temperatures up to 100° C. The aforesaid values of $\lambda_{\it eff}$ in Table 1 may be incorporated into various computer programs as described in this invention.

The cited values for $\lambda_{\it eff}$ as given in FIG. 5 and Table 1 are valid over a wide frequency range, from 0.001 Hz to 100 kHz as shown by direct experimental measurements utilizing the above mentioned sample set. These $\lambda_{\it eff}$ values are required for use with all of the cited equations and combinations thereof in conjunction with the downhole Induced Polarization Logging Tool, also revealed in this invention, thereby leading to the in-situ determinations of shaliness factor $Q_v$, brine conductivity $C_w$ and oil/water saturations in shaly sands.

Since the parameter values of $\lambda_{\it eff}$ are given in Table 1, in-situ measurements of quadrature (or out-of-phase) conductivity $C_Q$ provide a unique means of direct and continuous borehole measurements of the shaliness factor $Q_v$. Further, since $\lambda_{\it eff}$ is demonstrated to be only weakly dependent on sodium chloride solution concentration, the borehole $Q_v$ determinations can be made with only small errors even if the in-situ electrolyte concentration is not well known.

Figure 6:
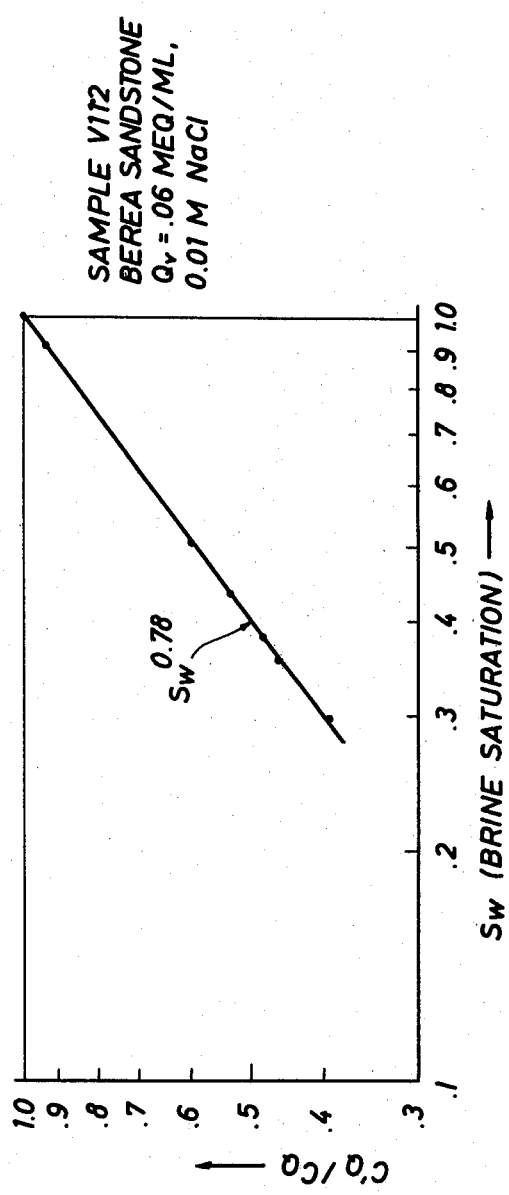
FIG. 6 is a graph of the quadrature conductivity $C_Q'$ of a typical oil-bearing sand as a function of oil saturation.

This invention also shows that the quadrature conductivity for a partially oil-bearing shaly sand ($S_w<1$) is $$C_Q' = \frac{1}{F^*} \lambda_{\it eff} Q_v S_w^{n^*-1} \quad (10)$$

where $C_Q'$ is the quadrature conductivity of a partially oil-bearing sand (mho-cm$^{-1}$), and F*, $\lambda_{\it eff}$, $Q_v$, and $n^*$ are as previously defined. The above equation for $C_Q'$ has been confirmed by direct experimental measurements on laboratory shaly sand samples, where the oil saturation has been varied systematically under conditions of capillary equilibrium. A typical example of the experimental measurements is revealed in FIG. 6.

It is well within the state of the art to write a computer program to solve equations (1,3,9,10) for the following set of petrophysical parameters:

$$\{(Q_v)_{brine\text{-}saturated\ sand},\ (Q_v)_{oil\text{-}bearing\ sand},\ C_w,\ S_w\}$$

from in-situ measurements of $$\{C_I,\ C_Q,\ C_I',\ C_Q'\ \text{and porosity}\}.$$

Various combinations of borehole data derived from the Induced Polarization Log, as revealed in this invention, and commonly available porosity tools (Compensated Density Log, Acoustic Log) and Resistivity/Conductivity Logs may be used to obtain continuous measures of the shaliness factor $Q_v$ and oil saturation $S_o$ downhole in formations of interest. Note that measurements on earth cores are now unnecessary because $\lambda_{\it eff}$ as given in Table 1 and FIG. 5 is the same for all shaly sands.

Examples of the use of such combinations are given below. As a first example, note that the downhole measurement of $C_I$ and $C_Q$ in a 100 percent brine-saturated formation, when combined with a measurement of porosity, leads to the evaluation of the shaliness parameter $Q_v$ and the water conductivity $C_w$ via equations 1 and 9.

Use of the previously cited relations for $C_I$, $C_I'$, $C_Q$ and $C_Q'$ lead to the following simple equations for the phase angles:

$$\theta = \frac{C_Q}{C_I} = \frac{\lambda_{\it eff} Q_v}{(C_w + BQ_v)} \quad (11)$$

-continued $$\theta' = \frac{C_Q}{C_I} = S_w^{-1} \left[ \frac{C_w + BQ_v}{C_w + \frac{BQ_v}{S_w}} \right] \quad (12)$$

Solving this set of equations for $S_w$ leads to:

$$S_w = \frac{\theta}{\theta'}\left(1 + \frac{BQ_v}{C_w}\right) - \frac{BQ_v}{C_w} \approx \frac{\theta}{\theta'} \text{ valid when } C_w >> BQ_v \quad (13)$$

Note that measurement of the phase angles $\theta$ and $\theta'$ determines oil/water saturations via equation 13 without requiring a knowledge of the Waxman-Smits saturation exponent $n^*$, if one assumes that only $S_w$ varies from the brine-filled zone to the oil-bearing zone.

As a further example, consider a completely water-bearing shaly sand adjacent to and connected with a similar sand containing hydrocarbons. For the oil-bearing sand, it is common practice to assume that the interstitial brine conductivity $C_w$ is the same as for the connected 100 percent water-bearing sand. However, in undeveloped oil fields, both $Q_v$ and $C_w$ parameters for the water sand are unknown. Manipulation of equations 1 and 9 yields the equation $$C_w = F^*\left(C_I - \frac{B}{\lambda_{eff}} C_Q\right) \quad (14)$$

The above may also be written as:

$$\log\left(C_I - \frac{B}{\lambda_{eff}}\right) = m^* \log \phi + \log C_w \quad (15)$$

The quantity $B/\lambda_{eff}$ is a very weak function of $C_w$, so that a reasonable value of $B/\lambda_{eff}$ may be assumed, i.e., the value at a salinity of 0.1 Normal NaCl. The function log $$\left(C_I - \frac{B}{\lambda_{eff}} C_Q\right)$$

is plotted versus log $\phi$ using downhole log-derived values for $C_I$, $C_Q$ and porosity, taken at a number of depths within the water sand. A regression lines through these points will have the slope $m^*$ and the intercept (log $C_w$). This value of $C_w$ can be used to refine the estimate of $B/\lambda_{eff}$ in a second iteration of this procedure. Having obtained the correct value of brine conductivity $C_w$ by the above method, the shaliness parameter $Q_v$ is calculated for the water-bearing zone using either equation 1 or 9 and the appropriate log responses. The oil saturation $S_o$ in the oil-bearing sand, as well as $Q_v$ in the oil-bearing sand, may now be calculated using equations 3 and 10. Note that use of this method requires only that $C_w$, and not $Q_v$, be the same in the water-bearing and oil-bearing sands.

TABLE I

QUADRATURE EQUIVALENT CONDUCTIVITY AS A FUNCTION OF TEMPERATURE AND SALINITY
$\lambda_{eff}(\times 10^{-4}$ mho-cm$^2$-meq$^{-1}$)

| NaCl NORMALITY | TEMPERATURE | | | |
|---|---|---|---|---|
| | 25° C. | 50° C. | 75° C. | 100° C. |
| 2.0 | 2.55 | 4.34 | 6.27 | 7.96 |
| 1.0 | 4.37 | 7.43 | 10.75 | 13.63 |
| 0.5 | 5.36 | 9.11 | 13.19 | 16.72 |
| 0.25 | 5.09 | 8.65 | 12.52 | 15.88 |
| 0.10 | 3.90 | 6.63 | 9.59 | 12.17 |
| 0.05 | 3.12 | 5.30 | 7.68 | 9.73 |
| 0.025 | 2.60 | 4.42 | 6.40 | 8.11 |
| 0.010 | 2.25 | 3.83 | 5.54 | 7.02 |
| 0.005 | 2.12 | 3.60 | 5.22 | 6.61 |
| 0.0025 | 2.05 | 3.49 | 5.04 | 6.40 |
| 0.0010 | 2.00 | 3.40 | 4.92 | 6.24 |

What is claimed is:

1. A method for providing a corrected electrical log of shaly sand formations penetrated by a wellbore using measurements made in-situ in the wellbore, said method comprising:

inducing an electrical current in the formation; measuring both the in-phase $C_I$ and quadrature conductivity $C_Q$ of the formation in response to said induced current; determining the conductivity of $C^*$ of the formation from the relation $$C^* = \left(C_I + \frac{B}{\lambda_{eff}} C_Q\right)$$

and recording the values of $C^*$ with respect to depth to provide an electrical log corrected for the presence of shale in said formations penetrated by the borehole.

2. The method of claim 1 wherein the in-phase and quadrature conductivities are measured in the frequency domain.

3. The method of claim 1 wherein the modulus of the conductivity and the phase angle are measured in the frequency domain.

4. The method of claim 1 wherein the electrical current has a frequency of less than 100 kHz.

5. The method of claim 1 and in addition determining the oil saturation of a shaly sand formation by using the equations $$C_I = \frac{1}{F^*} (C_w + BQ_v)$$

$$C_Q = \frac{1}{F^*} \lambda_{eff} Q_v$$

$$C_I = \frac{S_w^{n^*}}{F^*}\left(C_w + \frac{BQ_v}{S_w}\right)$$

$$C_Q = \frac{S_w^{n^*-1}}{F^*} \lambda_{eff} Q_v$$

6. The method of claim 1 and in addition determining the oil saturation of a shaly sand formation by first determining the formation water conductivity $C_w$ opposite an oil-free formation and then measuring the in-phase and quadrature conductivities opposite the oil-containing formation and determining the oil saturation from the following equations:

$$C_I = \frac{S_w^{n^*}}{F^*}\left(C_w + \frac{BQ_v}{S_w}\right)$$

$$C_Q = \frac{S_w^{n^*-1}}{F^*}\lambda_{eff}Q_v$$

7. The method of claim 1 wherein the current is generated in the formation using a first pair of spaced electrodes and the in-phase and quadrature voltage is measured between a second pair of spaced electrodes and where the in-phase and quadrature conductivity is determined from the aforementioned current and voltages.

* * * * *